Patented Nov. 19, 1946

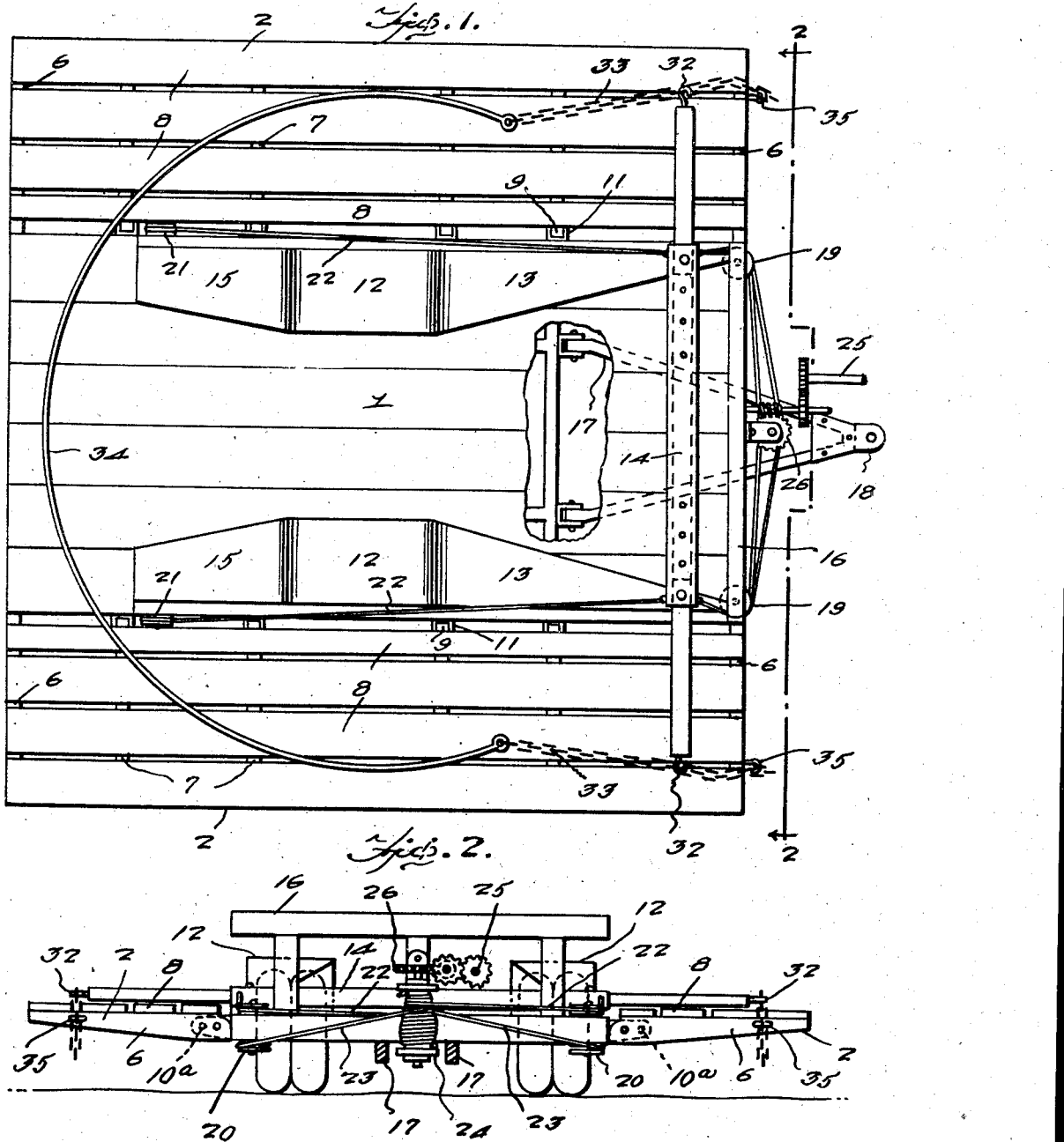

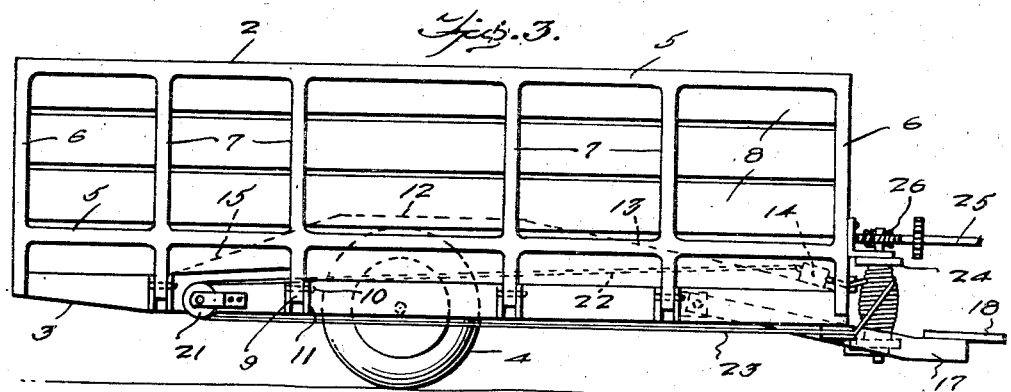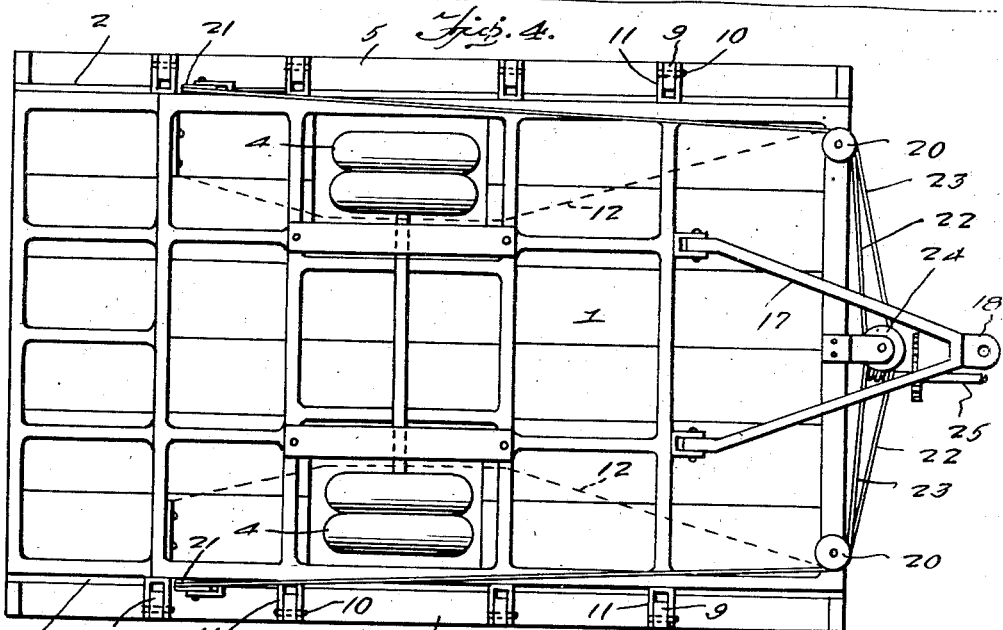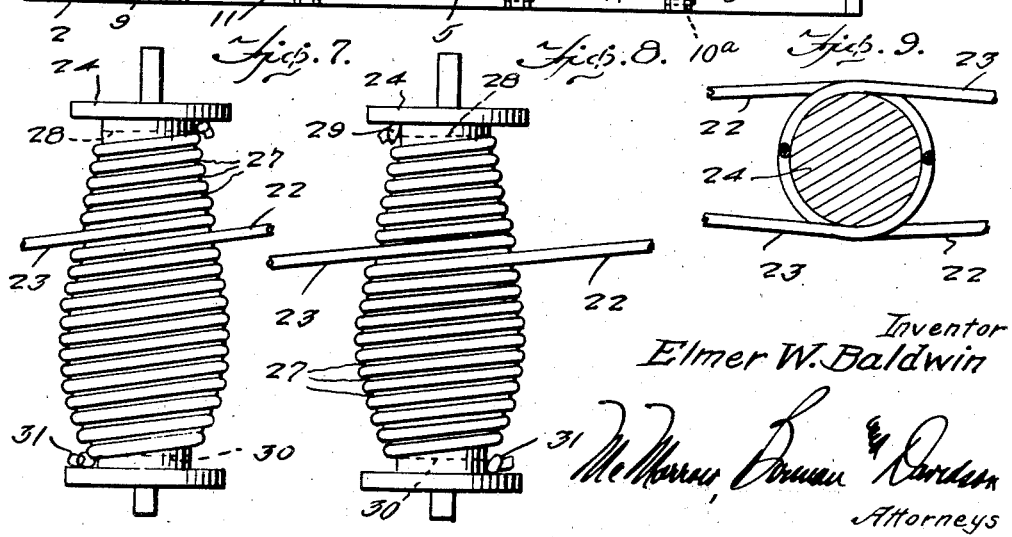

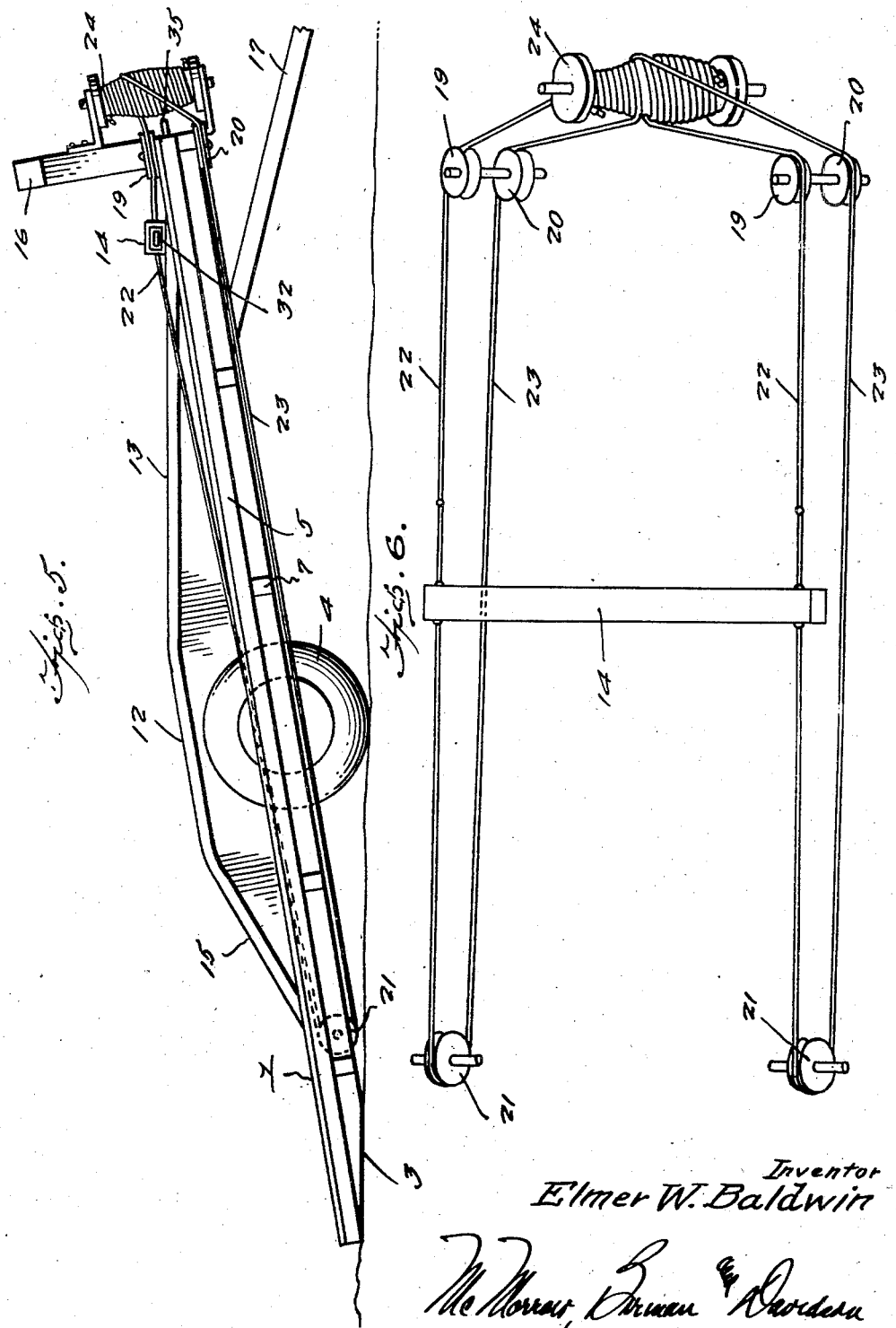

2,411,183

UNITED STATES PATENT OFFICE 2,411,183

POWERED LOADING TRUCK

Elmer W. Baldwin, Bassett, Nebr.

Application November 2, 1945, Serial No. 626,250

2 Claims. (Cl. 214—85)

The present invention relates to loading trucks and more particularly to loading trucks deriving power for the operation of its loading mechanism from a farm tractor or other suitable source.

One of the objects of the invention is to provide a loading truck for transporting stacks of hay or other crops.

Another object of the invention is to provide a powered loading truck which can be readily put to other farm hauling, such as moving heavy implements and carrying live stock about.

A further object of the invention is to provide a powered loading truck of simpler and more compact construction than prior devices.

With the foregoing and other objects and advantages in view, the invention consists of the novel construction and arrangements of parts hereinafter described and claimed.

In the accompanying drawings illustrating the invention,

Figure 1 is a top plan view of the invention in operative position.

Figure 2 is a transverse section on line 2—2 of Figure 1.

Figure 3 is a side elevation.

Figure 4 is a bottom plan view of the truck.

Figure 5 is a diagrammatic view showing the floor frame tilted for loading purposes.

Figure 6 is a diagrammatic plan of the windlass, cables and pulleys which move the transverse element to which the load is attached for loading purposes.

Figure 7 is a rear elevation of the winch, showing plan for winding a cable thereon.

Figure 8 is a front elevation showing the position of the cable illustrated in Figure 7.

Figure 9 is a top plan view of the winch showing the runs of both cables as they leave the winch.

Like numerals in the description and drawings designate the same parts of construction.

The body of the truck is tiltable and may be constructed of channeled steel or other suitable material suitably dimensioned as to length and width, and consists, in the main, of a floor 1 and detachably hinged sides 2. The floor boards are supported on a frame of parallel side bars suitably connected and braced by end and intermediate cross bars to form a rectangular frame. The rear ends of the side bars are inclined on the underside, as at 3, to permit the rear of the floor to rest in close proximity to the ground when tilted downwardly, as illustrated in Figure 5. The truck is mounted on suitable wheels 4 at a suitable distance in the rear of the center of gravity of the truck to hold it substantially horizontal, normally, but allow it to be tilted as hereinafter explained.

Sides 2 consist of an open rectangular frame with parallel top and bottom bars 5 and connecting end bars 6, with intermediate vertical brace bars 7. The inner sides of the frames are provided with longitudinal strips 8 spaced apart as desired. The vertical bars 7 extend below the bottom bars of the sides and are detachably hinged to the floor frame as at 9. The hinge pins 10, which pass through holes in the bars 7 and registering holes in brackets 11 on the floor frame, can be removed whenever it is desirable to take the sides 2 off the truck. The sides are locked in vertical position by pins set in holes 10a in the hinge plate and uprights 7, which register.

The upright bars 7 are beveled on the bottom to impinge the side bars of the truck frame when the sides are dropped, thus holding them in horizontal position.

Dual traction wheels are preferably employed for the truck and the size thereof and the location of the wheel shaft close to the ground are designed to produce a low slung main frame so as to have it operatively close to the ground.

The upper portions of the wheels project through the floor of the truck and are covered by housings 12 which extend longitudinally towards the front and rear of the floor. These extensions are inclined downwardly to the floor and suitably slanted on the inner edges to form upwardly inclined ramps or slide-ways 13 in the front part of the truck for a transversely disposed, extensible load-sling element 14. The inclination of the housing towards the rear forms ramps 15 up which the hay stack may be hauled when the floor of the truck is tilted down at the rear.

Brakes are used in conjunction with the traction wheels to lock them against rolling when the floor is tilted.

Holding the wheels stationary facilitates tilting of the floor, as rearwardly acting force is applied to the front, as hereinafter explained.

An horizontal cross-bar 16, with vertical supports, is mounted on the front of the truck floor 1.

The tongue 17 of the truck is pivotally attached to its underside, a suitable distance from the front and the front end of the tongue is constructed as at 18 for swivel connection with a tractor or other vehicle.

On the top and bottom of the front end bar of the floor frame are horizontally disposed pulleys 19 and 20 and on the outer side of each side bar of the frame, adjacent the rear thereof, is a vertically disposed pulley 21. The pulleys 19 carry a cable 22, whose free ends are attached to the front of a sling coupling bar 14 and the lower pulleys 20 carry a cable 23 which runs around each pulley 21 to the rear side of said sling element where the free ends are attached. The point of attachment of each cable is adjacent the ends of the sling-element 14, which is extensible for adjustment longitudinally.

Mounted on the front of the middle support of cross-bar 16, is a vertically disposed winch 24, the rotatable shaft of which is operated by a power take-off shaft 25 and universal connected to a power unit. The shaft of the power take-off unit operates a worm 26 on the upper extremity of the winch-drum shaft. For the purpose of rotating the winch in either direction, the drive shaft of the power unit should be capable of being reversed.

The drum of the winch is circular in form with a periphery which bulges gradually from the ends to the middle, as illustrated in Figures 7 and 8, and is provided with a spiral double groove 27, arranged in direction like a right hand screw thread. The upper extremity of the drum is provided with a transverse aperture 28 which is adapted to contain the cable 23, doubled and knotted outside the aperture, as at 29, to secure the doubled cable to the drum. At the bottom of the drum is a similar aperture 30 for the reception of cable 22 which is also knotted, as at 31 for the purpose of securing it to the drum.

In winding cables 22 and 23 on the drum, the two runs, created by doubling each cable, are wound in the same direction on the drum but in contiguous grooves, with the windings of cable 23 above those of cable 22. The runs are then diverted in opposite directions when they leave the drum. The cables 22 and 23 are wound from the ends of the drum towards its middle but in opposite directions, thus when the drum revolves, the runs of one cable wind up while the runs of the other cable unwind.

By means of the foregoing arrangement of the cables the sling bar 14 is drawn to the rear when the drum revolves from left to right and to the front when the winch is reversed and the drum revolved from right to left, thus moving the sling-bar in either longitudinal direction, as desired. It will be observed by reference to Figures 7, 8 and 9 that rotation of the winch in either direction winds up on the runs of one cable while unwinding the runs of the other cable, and slack in each cable during the unwinding thereof is obviated by the peculiar, bulging shape of the winch drum and the ramps.

Attached to the ends of the bar are hooks 32 which are adapted to engage a link chain 33, attached to a sling 34 in the loading and unloading operations. The sling can be adjusted, as will be obvious, by engaging the links of the chains on the hooks as desired. Hooks 35 are provided on the front of the truck sides, to be used with the chains when bar 14 is moved to the rear to take up slack and is detached from the chains for that purpose.

In operation, for loading stacks of hay or other crops, the sides of the truck are let down to horizontal position and the sling bar 14 is extended, as illustrated in Figures 1 and 2. The truck is positioned close to the stack and then tilted, as illustrated in Figure 5. Sling bar 14 is then drawn up on ramps 15, the sling, preferably a cable, is passed around the stack, the chains adjusted to draw the sling to the proper hold and the winch rotated by the power take-off to draw the sling bar towards the front of the truck, thus hauling the stack onto the truck. To unload the stack, at any other place, the sling is removed and sling bar movement is reversed on the stack, the winch is rotated in the other direction and the bar 14 operates to push the stack out of the truck, which tilts under movement of the load. In order to tilt the truck, the wheels are braked to prevent movement and the tractor is backed up, thus causing the pivotal element 17 to lift the front of the truck frame until the rear end of the floor rests on the ground where the tractor is stopped. This is for the purpose of loading.

When not operated to haul crops around as just explained, the sides are raised and the truck can then be employed as a trailer for hauling horses, cattle and merchandise. For heavy loading requiring the use of the winch and tilting the truck, the operation will be the same as that heretofore explained.

An important contemplated use of my loading truck is that hay or the like may be stacked directly on the truck by any conventional stacker, which stacker may be operated by the same power unit used to operate my loading truck, and when the stacking operation is completed the truck carrying the stack can be moved to any desired location for feeding or storage purposes.

While I have illustrated and described my invention in some detail, it is to be understood that the invention is not to be limited to such details, but only by the spirit of the invention and the scope of the appended claims.

Having thus described my invention what I claim as new and desire to secure by Letters Patent is:

1. In combination, a tiltable truck, an horizontally movable, sling-coupling bar mounted transversely on said truck, longitudinally disposed ramps mounted on the floor of the truck, a sling detachably connected to said coupling bar, means for adjusting said sling to a load, a powered winch located on the truck and provided with means to reverse direction of revolution, a winch drum having a peripheral bulge diminishing in diameter from the middle of the drum towards its ends, a spiral cable groove in said periphery, two cables doubled and attached at the middle to said drum, one at each end thereof with the dual runs of each wound toward the middle of the drum in contiguous parts of said spiral groove, said cables being wound thereon in opposite directions and attached at their free ends to opposite sides of said coupling bar, and anti-friction devices mounted on said truck to carry said cables from the winch to said coupling bar.

2. In combination, a tiltable truck, said truck being provided with drop sides and means thereon to secure them in horizontal position, an horizontally movable load-sling mounted on the truck, a powered winch located thereon and provided with a drum having a peripheral bulge diminishing in diameter from the middle of the drum towards its ends, a spiral double groove in said periphery, two cables doubled and attached at the middle to said drum, one at each end, and the dual runs of each wound toward the middle of the drum in contiguous parts of the groove, said cables being wound thereon in opposite directions and their free ends attached to said sling in a manner to move same in either longitudinal direction, and anti-friction devices mounted on said truck to carry said cables from the winch to the sling.

ELMER W. BALDWIN.